United States Patent [19]
Jardin

[11] 3,913,972
[45] Oct. 21, 1975

[54] ADJUSTABLE LIFTING MECHANISM FOR AUTOMOBILE SLIDING ROOF

[75] Inventor: Hans Jardin, Krailling, Germany

[73] Assignee: Webasto-Werk W. Baier KG, Stockdorf, Munich, Germany

[22] Filed: June 17, 1974

[21] Appl. No.: 480,243

[30] Foreign Application Priority Data
June 16, 1973 Germany............................ 2330754

[52] U.S. Cl................. 296/137 F; 49/451; 292/167
[51] Int. Cl.²................................................ B60J 7/04
[58] Field of Search......... 296/137 R, 137 B, 137 E, 296/137 F, 137 H, 137 G; 292/196, 223, 167, 158, 139, 97, 123, DIG. 60; 49/451, 234

[56] References Cited
UNITED STATES PATENTS
821,228    5/1906   Erb....................................... 49/451

3,043,605   7/1962   McKay............................... 292/167

FOREIGN PATENTS OR APPLICATIONS
635,586   4/1950   United Kingdom............. 296/137 F Primary Examiner—Robert J. Spar
Assistant Examiner—Gary Auton
Attorney, Agent, or Firm—Joseph A. Geiger

[57] ABSTRACT

A sliding roof mechanism for the opening and closing of a rigid sliding roof panel by lowering or raising the rear portion of the panel before and after horizontal movement thereof, the mechanism being self-locking in the closed panel position and the latter position being adjustable by means of displaceable pivot blocks on the transverse rocker arms.

8 Claims, 4 Drawing Figures

ADJUSTABLE LIFTING MECHANISM FOR AUTOMOBILE SLIDING ROOF

BACKGROUND OF THE INVENTION

1. Field of the Invention

The present invention relates to mechanisms for the opening and closing of sliding panels on automobile roofs, and in particular to adjustable lifting mechanisms for manually operated sliding roof panels which are adapted for retraction under the stationary roof portion, after the rear end of the sliding roof panel is lowered through the actuation of a crank-operated linkage.

2. Description of the Prior Art

Clamping devices using clamping linkages for the actuation of two laterally spaced lifting devices are known from the prior art. In each case, however, some provision has to be made to permit corrective adjustment of the closed position of the movable sliding roof panel in relation to the surrounding stationary roof portion, in order to obtain a leak-proof closed position and an esthetically acceptable appearance of outside alignment of the movable panel and of the surrounding roof portions. In known prior art devices of this kind, this adjustment possibility is provided at the lifting linkages themselves.

A major shortcoming of any adjustment device associated with the lifting linkages under the rear portion of the sliding roof panel is the fact that their location near the rear end of the panel renders access to the devices difficult, especially after the canopy cover has been installed on the inside of the sliding roof panel. Any such adjustment makes it necessary to remove a large portion of the canopy cover, in order to gain access to the adjustment devices.

SUMMARY OF THE INVENTION

It is a primary objective of the present invention to suggest a novel adjustable sliding roof mechanism capable of adjustably holding the sliding roof panel in its closed position, adjustment being obtained by means of adjusting elements which are easily accessible, even after assembly of the canopy cover, without the need of removing a major portion of the latter.

The present invention proposes to attain the above objective by suggesting a mechanism for lowering and raising the rear portion of the rigid sliding roof panel and for adjustably holding it in a self-locking raised, i.e., closed position, by providing adjustment means for said raised position which are associated with the pivot points of two transversely extending rocking levers linking a central operating handle with two laterally arranged longitudinally movable connecting rods which, in turn, control the position of the lifting linkages under the rear portion of the sliding roof panel. Sliding roof mechanisms containing various of the above-mentioned operating components are disclosed in the co-pending U.S. patent application Ser. No. 349,183 filed Apr. 9, 1973 and in U.S. Pat. No. 3,857,603.

In a preferred embodiment of the invention, the adjustment of the pivot points on the rocking levers is obtained by means of displaceable pivot blocks receiving the rocking levers within a horizontal passage which engages opposite sides of the rocking levers with convexly curved flanks. Displacement of the pivot blocks is preferably obtained by means of a longitudinal guide slot arranged in a horizontal wall portion of the sliding roof panel, the pivot block reaching through the guide slot and having cooperating lateral guide grooves engaging the panel wall portion.

The fore and aft adjustment of these displaceable pivot blocks produces a corresponding height adjustment on the associated lifting linkages, as a result of the fixed dead-center position of the operating handle pin engaging the overlapping slots of the rocking levers in the raised panel position. In order to obtain a fine adjustment of this raised position on either side of the sliding roof panel, the invention further suggests the use of an axially confined adjustment screw engaging a matching thread in the pivot block, the adjustment screws of the two pivot blocks being conveniently accessible in the forward portion of the sliding roof panel, from underneath the panel.

The novel adjustment means suggested by the invention are thus easily accessible and inexpensive in production, while requiring no maintenance.

BRIEF DESCRIPTION OF THE DRAWINGS

Further special features and advantages of the invention will become apparent from the description following below, when taken together with the accompanying drawing, which illustrates, by way of example, an embodiment of the invention, represented in the various figures as follows.

DESCRIPTION OF THE PREFERRED EMBODIMENT

Figure 1:
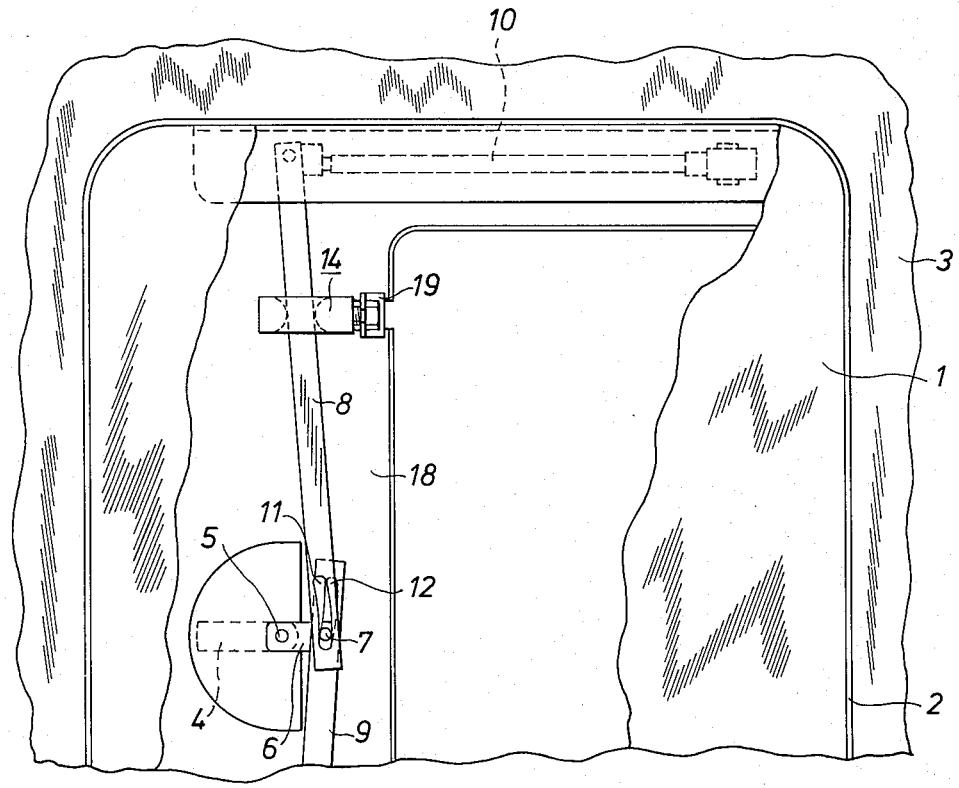
FIG. 1 shows in a partial top plan view the general arrangement of a sliding roof mechanism embodying the invention, portions of the upper skin of the sliding roof panel being removed for purposes of illustration.

Referring to FIG. 1, there is shown a rigid sliding roof panel 1, mounted inside a matching opening 2 of an automobile roof 3, panel 1 being shown in its closed position. A mechanism consisting of a series of interconnected elements serves for the raising and lowering of the rear portion of panel 1, when the latter is to be closed or opened, respectively.

Figure 2:
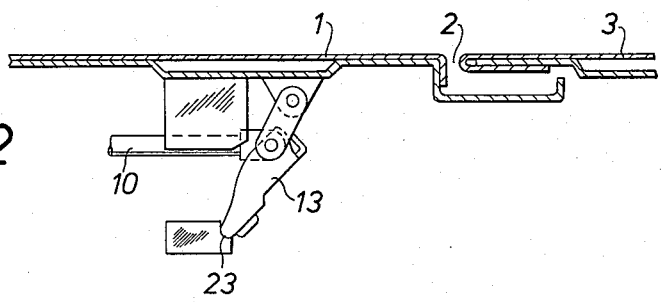
FIG. 2 shows in an enlarged longitudinal cross section one of the two lifting linkages of the mechanism of the invention.

Two lifting linkages, illustrated in FIG. 2, are attached to the underside of the rear portion of the sliding roof panel 1, near the lateral edges of the panel. A lifting linkage of this type, which also serves as a clamping linkage, is disclosed in more detail in my earlier-mentioned co-pending application Ser. No. 349,184, now U.S. Pat. No. 3,857,603. As can be seen from FIG. 2, a fore or aft motion of the lateral connecting rod 10 causes the clamping lever 13 of the lifting linkage to swing upwardly or downwardly around a fixed pivot point 23, thereby raising or lowering the rear portion of panel 1 accordingly.

The two horizontally extending connecting rods 10 are attached at their forward extremities to the outer ends of two transversely extending rocking levers 8 and 9 which overlap each other near the center of panel 1. In their overlapping inner end portions, the rocking levers 8 and 9 have aligned slots 11 and 12, respectively, which are engaged by a vertical pin 7 which is carried by the arm 6 of an operating handle 4. This pin 7 and the slots 11 and 12 of the rocking levers 8 and 9 cooperate with each other in the manner of a cam and cam follower, when the operating handle 4 is rotated around its vertical pivot pin 5.

In FIG. 1 the operating handle 4 and the rocking levers 8 and 9 are shown in a position which corresponds to the fully raised position of the sliding roof panel 1. As can readily be seen, this engagement position between pin 7 of the operating handle and slots 11 and 12 of the rocker arms is a so-called self-locking position, because pin 7 is oriented dead-center in relation to the pivot axis 5 of the handle 4. This self-locking feature means that, when the panel 1 is in its closed position (FIG. 1), it cannot be opened accidentally or intentionally by any force applied to the panel itself or to any part of its mechanism, with the exception of operating handle 4.

Figure 3:
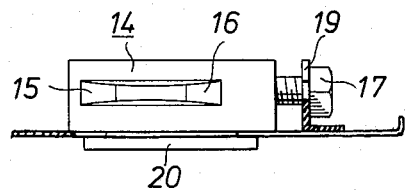
FIG. 3 shows in a likewise enlarged elevational view an adjustable pivot block for the mechanism of the invention.
Figure 4:
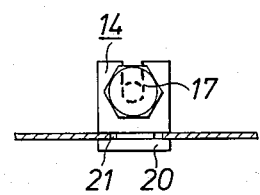
FIG. 4 shows the pivot block of FIG. 3 in a side view.

Each of the two transverse rocking levers 8 and 9 is supported and pivotably retained at a point between its inner and outer extremities by means of a pivot block 14, shown in FIG. 1 and also illustrated at an enlarged scale in FIGS. 3 and 4. This pivot block 14 has a generally rectangular guide passage for the rocking lever, with oppositely facing convex guide flanks 15 and 16 of the guide passage engaging the outer faces of the rectangular rod constituting the rocking lever. The guide block 14 is adjustably retained against a horizontal wall portion 18 of the sliding roof panel, reaching through a longitudinal guide slot 21 thereof, so as to form a guide nose 20, with longitudinal guide grooves between nose 20 and pivot block 14. The latter is thereby vertically retained and longitudinally guided for adjustment motions with respect to pin 7 of the rocking lever activating handle 4. These adjustment motions are conveniently obtained by means of an adjustment screw 17 which is axially retained by its neck in a bracket 19 attached to the panel wall portion 18. By engaging a cooperating thread in the block 14, the adjustment screw 17 determines the relative location of the motion end positions of a rocking lever, thereby also determining the exact level of the sliding roof panel 1 on that same side. Rotation of the adjustment screw 17 thus permits a fine-adjustment of the closed panel 1 in relation to the surrounding stationary roof portion 3.

It should be understood, of course, that the foregoing disclosure describes only a preferred embodiment of the invention and that it is intended to cover all changes and modifications of this example of the invention which fall within the scope of the appended claims.

I claim:

1. In a mechanism designed for lowering the rear portion of a rigid automobile sliding roof panel, for opening it through retraction under a stationary roof portion, and for correspondingly raising the panel, after it has been advanced toward the closed position, wherein said panel rear portion is supported on both lateral sides by a pivoting lifting linkage attached to the panel, which linkage is adapted for raising and lowering the panel in response to the fore and aft motions of two connecting rods extending horizontally forwardly from the two lifting linkages, a mechanism combination for adjustably holding the sliding roof panel in a self-locking raised, i.e. closed, position comprising in combination:

a pair of transversely extending rocking levers mounted on the sliding roof panel, the levers having outer ends by which they are connected to the connecting rods and inner end portions located near the center of the roof panel;

a first vertical-axis pivot connection between the roof panel and a point on each rocking lever located intermediate its inner and outer ends;

an operating handle located adjacent said inner end portions of the rocking levers, the handle being rotatably connected to the roof panel by means of a second pivot connection;

actuating means defined by said inner end portions and by the operating handle for obtaining a fore and aft pivoting motion of the rocking levers from a rotary motion of the operating handle, thereby raising and lowering the rear portion of the roof panel, said actuating means having a self-locking engagement postion of the dead-center type in at least the handle position which corresponds to the raised roof panel; and means associated with the rocking levers for adjusting said raised position of the roof panel in relation to said self-locking engagement position of the actuating means; said panel position adjusting means being part of said first vertical-axis pivot connections of the two rocking levers.

2. A mechanism combination as defined in claim 1, wherein the panel position adjusting means includes, as part of each of said first vertical-axis pivot connections, a pivot member which permits fore and aft adjustment of the pivot point in relation to the sliding roof panel.

3. A mechanism combination as defined in claim 1, wherein:

the rocking levers are rods; and the panel position adjusting means includes, as part of each of said first vertical-axis pivot connections:

a pivot block with a horizontal transverse passage therethrough for the guided reception of the associated rocking lever therein, the pivot block having convexly curved opposing flanks engaging the rocking lever from both sides; and means for adjustably positioning the pivot block on the roof panel in different positions.

4. A mechanism combination as defined in claim 3, wherein the pivot block positioning means includes pivot block guide means defined between the pivot block and the sliding roof panel for guided fore and aft adjustment of the pivot block.

5. A mechanism combination as defined in claim 4 wherein:

the pivot block guide means includes a guide slot in a horizontal wall portion of the sliding roof panel; said guide slot extending in the direction of pivot block adjustability;

the pivot block extends through said slot to the other side of said panel wall portion; and the pivot block guide means further includes lateral guide grooves in the pivot block adapted to the thickness of said panel wall portion, so as to engage it along the guide slot on both sides thereof.

6. A mechanism combination as defined in claim 4, wherein the pivot block positioning means further includes horizontally oriented threaded means for fine-adjusting the pivot block position.

7. A mechanism combination as defined in claim 6, wherein the threaded fine-adjustment means is an axially restrained, rotatable screw member engaging a cooperating threaded bore in the pivot block.

8. A mechanism combination as defined in claim 1, wherein:

the inner end portions of the rocking levers overlap and include vertically aligned slots defining cam elements;

the operating handle carries a vertical pin attached thereto and engaging the slots of both rocking levers, thereby defining a cooperating common follower element; and said slots and pin cooperate in such a way that they define a self-locking engagement of the dead-center type in at least the rocking lever position at which the rear portion of the sliding roof panel is closed.

\* \* \* \* \*